United States Patent [19]

Mörz

[11] Patent Number: 4,578,679

[45] Date of Patent: Mar. 25, 1986

[54] METHOD AND APPARATUS FOR OBTAINING ANTENNA TRACKING SIGNALS

[75] Inventor: Günter Mörz, Ludwigsburg, Fed. Rep. of Germany

[73] Assignee: Ant Nachrichtentechnik GmbH, Backnang, Fed. Rep. of Germany

[21] Appl. No.: 491,939

[22] Filed: May 5, 1983

[30] Foreign Application Priority Data

May 5, 1982 [DE] Fed. Rep. of Germany ....... 3216708

[51] Int. Cl.[4] .............................................. G01S 5/02
[52] U.S. Cl. ..................................... 343/427; 343/373
[58] Field of Search ............... 343/373, 383, 384, 417, 343/427, 380, 381, 382, 368, 369, 372

[56] References Cited

U.S. PATENT DOCUMENTS

| | | | |
|---|---|---|---|
| 3,353,183 | 11/1967 | Giger | 343/427 |
| 3,758,880 | 9/1973 | Mörz | 343/350 X |
| 3,803,624 | 4/1974 | Kinsey | 343/373 X |
| 3,864,683 | 2/1975 | Mörz | 343/417 |
| 3,999,182 | 12/1976 | Moeller et al. | 343/372 |
| 4,047,128 | 9/1977 | Mörz | 343/756 X |
| 4,074,266 | 2/1978 | Yokoi et al. | 343/368 X |
| 4,103,304 | 7/1978 | Burnham et al. | 343/427 |
| 4,122,453 | 10/1978 | Profera | 343/373 |
| 4,136,343 | 1/1979 | Heffner et al. | 343/427 |
| 4,189,733 | 2/1980 | Malm | 343/368 |
| 4,215,347 | 7/1980 | Jarrell et al. | 343/427 |
| 4,316,190 | 2/1982 | Cole | 343/380 X |
| 4,348,676 | 9/1982 | Tom | 343/369 X |
| 4,408,205 | 10/1983 | Hockham | 343/368 X |

FOREIGN PATENT DOCUMENTS

| | | |
|---|---|---|
| 1936692 | 1/1970 | Fed. Rep. of Germany . |
| 2215745 | 3/1971 | Fed. Rep. of Germany . |
| 2212996 | 9/1973 | Fed. Rep. of Germany . |
| 2935136 | 3/1981 | Fed. Rep. of Germany . |

OTHER PUBLICATIONS

Electronics 5/1/67, "Apollo Antenna Fastens on the Beam to the Moon", Seiten 80–86 Notthoff.

Primary Examiner—Charles T. Jordan
Assistant Examiner—Brian S. Steinberger
Attorney, Agent, or Firm—Spencer & Frank

[57] ABSTRACT

A method and apparatus for deriving control signals for enabling an antenna to track a signal source and this antenna is operated to produce at least one beam having a maximum on the boresight axis and one beam having a minimum on the boresight axis, by deriving a sum signal associated to the beam having a maximum on the boresight axis and a difference signal associated to the beam having a minimum on the boresight axis, sequentially and cyclically varying the relative phase relationship between the difference and the sum signal among four different phase values, and combining the sum signal with the difference signal for producing signals constituting a source of the control signals for enabling the antenna to track the signal source.

3 Claims, 5 Drawing Figures

METHOD AND APPARATUS FOR OBTAINING ANTENNA TRACKING SIGNALS

BACKGROUND OF THE INVENTION

The present invention relates to a method for obtaining control signals to aim an antenna toward a signal source, in which a sum and difference signal are derived from the signal received by the antenna, the difference of phase between sum and difference signal is subject to a cyclic phase change, and these signals are superposed so that a signal is produced from which control values are derived for the movement of the antenna into the desired direction.

In satellite transmissions or in radar systems, for example, reflector antennas are equipped with servo follow-up systems for tracking targets. For this purpose, systems operating according to the so-called monopulse method, as described, e.g. in German OS No. 1,936,692, are in wide use. In this method, criteria for the deviation of the antenna boresight axis from the desired direction are derived from at least two different radiation patterns, or beams. The normal antenna beam whose field intensity maximum lies on the boresight axis of the antenna serves as the reference beam. The additionally generated radiation beam or beams—called difference beams—have a point of zero field intensity on the boresight axis and a phase reversal.

With the aid of the reference beam, which is also called the sum beam, and with the use of the difference beams, it is possible to generate deviation proportional signals by means of synchronous demodulation. Such signals can be utilized to point the antenna back onto its target.

The sum and difference beams are generated either from the radiation beams of various waveguide modes excited in the antenna feeder system—this is then called the multimode monopulse method—by way of sum or difference formation of the received signals from a plurality of individual feedhorn. The system described by Notthof, "Apollo antenna fastens on the beam to the moon," in Electronics, May 1, 1967, pages 80-86, is based on the latter method. Here, two difference signals are derived by individual feedhorns from the received signals, and these two difference signals are oriented in the directions of the cartesian coordinates x and y, respectively. The deviation information is determined in that these two difference signals are alternatingly superposed on the sum signal, with each difference signal being subjected to a cyclic phase reversal between the two phase states 0° and 180°.

If the transmitted signals are linearly polarized signals two difference signals are required, as described above, to derive the deviation information.

With circular polarization, however, a single difference signal oriented in polar coordinates is sufficient for this purpose. Such a difference signal oriented in polar coordinates can be derived from a circular field distribution (e.g. the $H_{01}$ mode) in the antenna feeder system or from the radial field distribution (e.g. the $E_{01}$ mode). It must also be mentioned that, even with linear polarization, a difference signal can be obtained which is oriented in polar coordinates. Such signal is obtained by vector addition from the two difference signals oriented in cartesian coordinates x and y.

SUMMARY OF THE INVENTION

It is an object of the present invention to provide a method of the above-mentioned type which requires only a single difference signal oriented in polar coordinates, and in which it is sufficient to detect the amplitude of the signal produced from a combination of the sum and difference signals to be able to obtain control signals for antenna tracking.

This is accomplished, according to the present invention, basically by producing a causing the cyclic change in the phase difference between the difference and sum signal. The phase difference has four different phase states.

The invention will now be explained in greater detail with the reference to embodiments which are illustrated in the drawing.

DESCRIPTION OF THE PREFERRED EMBODIMENTS

Figure 1:
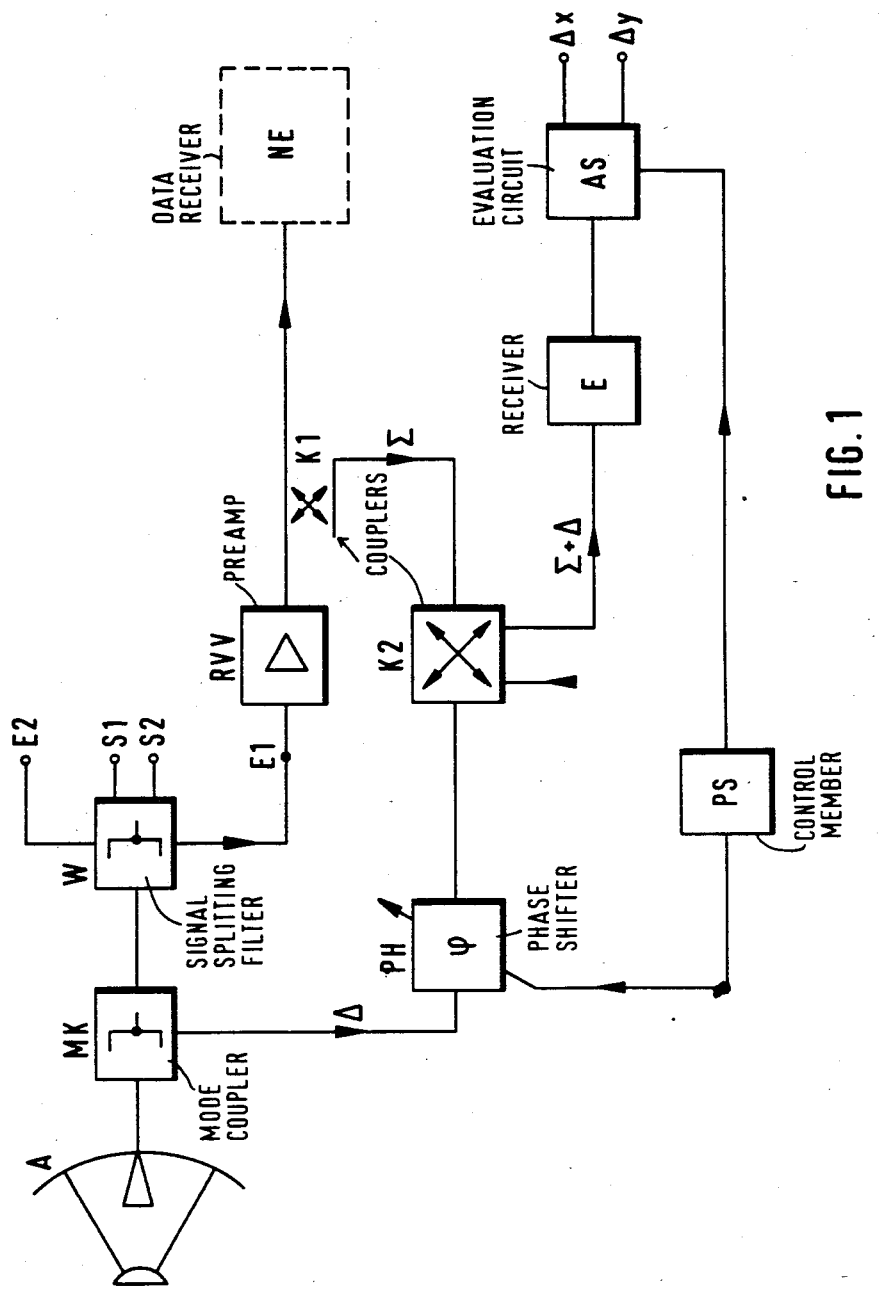
FIGS. 1 and 2 are block circuit diagrams of two embodiments of devices for combining sum signal with a difference signal which is subjected to cyclic phase changes.
Figure 2:
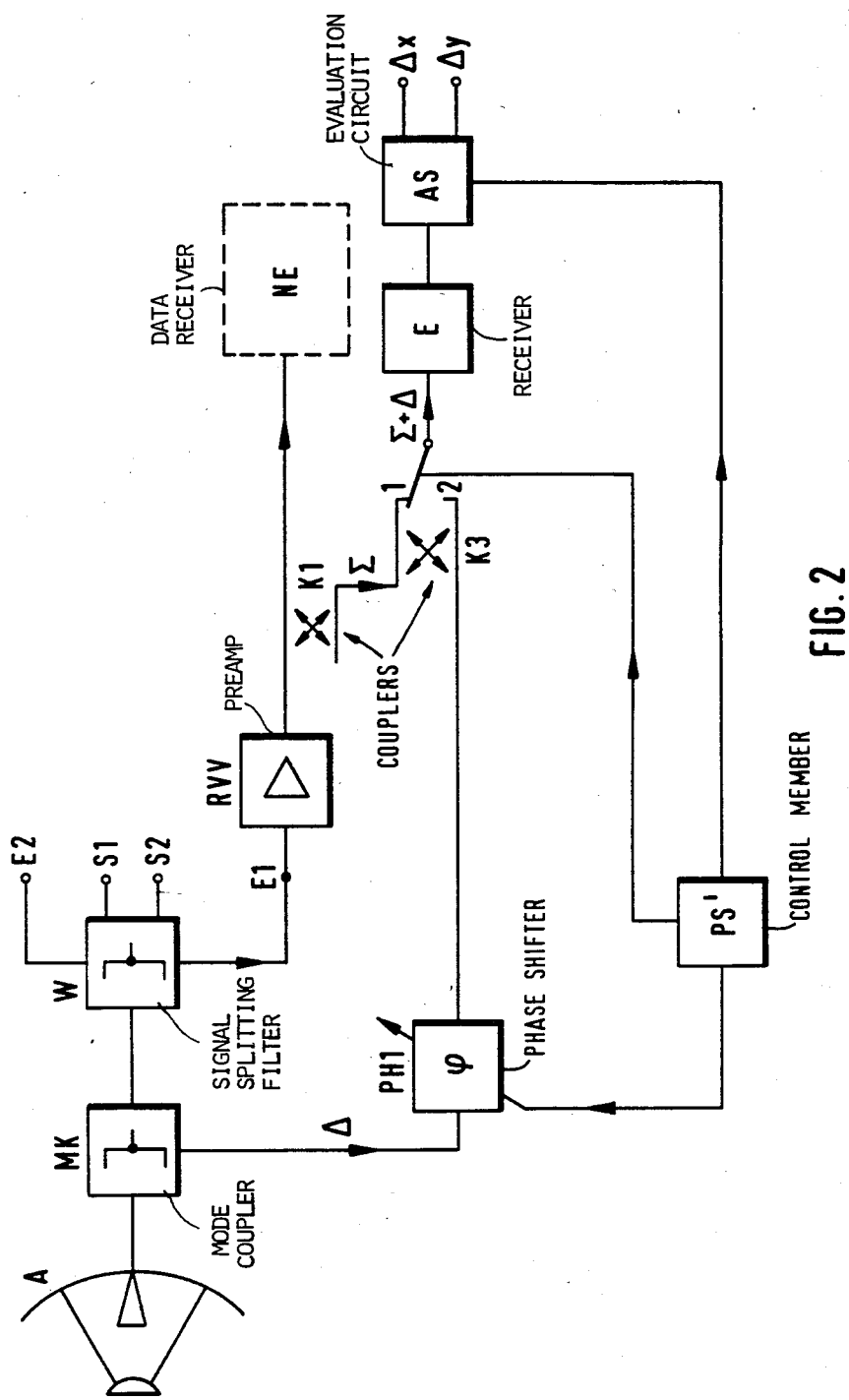

Both embodiments shown in FIGS. 1 and 2 have the following basic circuit structure: a mode coupler MK is connected to the feedhorn of an antenna A, e.g. a cassegrain antenna, to couple out a difference signal $\Delta$ which is defined by polar coordinates. Such a mode coupler is known from a dissertation given by G. Mörz at the Rheinisch-Westfälisch Technische Hochschule Aachen, D 82, 1978.

Frequently, antennas operate in a combined transmitreceive mode, with each one of the frequency bands being doubly utilized through the use of orthogonal polarization. To be able to separate from one another the received signals E1, E2 and the transmitted signals S1, S2, a filter W quadruplexer to split the frequency bands and polarizations is disposed behind the mode coupler MK.

Generally, an unmodulated carrier, also called a beacon signal, is transmitted in the direction of the adjustable antenna. In the present embodiments, it is assumed that such a beacon signal has been received in the receiving path together with signal E1. After the signal E1 has been amplified in a low-noise preamplifier RVV, a coupler K1 splits off a part which is to serve as the sum signal $\Sigma$. The other part of signal E1 is fed to a data receiver NE.

The sum signal $\Sigma$ is superposed in a coupler K2 in FIG. 1, or K3 in FIG. 2, respectively, on the difference signal $\Delta$ which is subjected to cyclic phase changes in a phase member PH in FIG. 1 or PH1 in FIG. 2, respectively. The resulting signal $\Sigma+\Delta$ is then fed to a receiver E and an evaluation circuit AS where control values $\Delta x$ and $\Delta y$ for the servo follow-up system of the antenna are derived from the signal $\Sigma+\Delta$. The system according to which the signal $\Sigma+\Delta$ is evaluated will be described below.

A phase control circuit PS or PS' causes the phase member PH or PH1 to shift between the different phase states.

In the arrangement shown in FIG. 1, phase member PH can be placed in four phase states, 0°, 90°, 180° and 270°. In contradistinction thereto, phase member PH1 of the arrangement shown in FIG. 2 can be placed in only two phase states, 0° and 90°. To be able to subject the difference signal here as well as to phase shifts of 180° and 270°, coupler K3, in which the sum signal and the difference signal are combined is designed as a 3 dB directional coupler or magic T.

The 3 dB directional coupler or the magic T, respectively, has the characteristic that the sum ($\Sigma + \Delta$) of the two signals applied to its input ports appears at one output port 1 and at the other output port 2 the difference ($\Sigma - \Delta$) appears. That means, therefore, that with the phase member PH1 set to the phase position of 0°, the sum of the difference signal $\Delta$, shifted in phase by 0° and the sum signal $\Sigma$ appears at the output port 1 of coupler K3, while at output port 2 there appears the sum of difference signal $\Delta$ shifted in phase by 180° and the sum signal $\Sigma$. If the phase member is in the 90° phase position, then the sum of the difference signal $\Delta$ shifted in phase by 90° and the sum signal $\Sigma$ appears at output port 1 of coupler K3 and the sum of the difference signal $\Delta$ shifted in phase by 270° and sum signal $\Sigma$ is available at output port 2. The phase control circuit PS' provides the correct cyclic phase setting of phase member PH1 and selective connection of receiver E to port 1 or 2 of coupler K3.

Figure 3A:
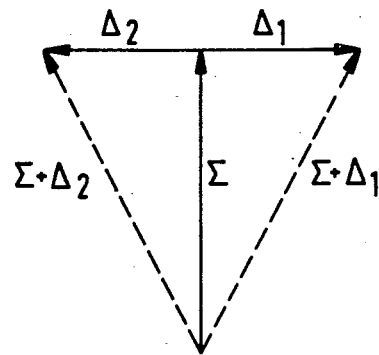
FIGS. 3a and 3b are vector diagrams representing the combination of sum and difference signals according to the invention.
Figure 3B:
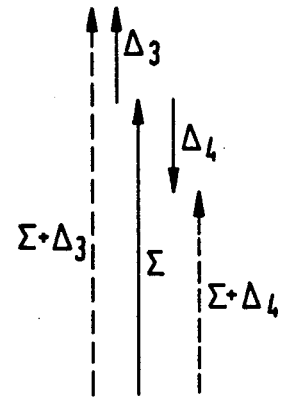

The vector diagrams shown in FIGS. 3a and 3b will now serve to explain how information regarding the deviation of the antenna orientation from the desired direction results from the superposition of the sum signal $\Sigma$ and the difference signal $\Delta$.

For the explanation it is arbitrarily assumed that the phase relationship between the sum signal $\Sigma$ and the difference signal $\Delta$ has been selected in such a manner that the difference signal oriented in polar coordinates forms an angle of 90° with the sum signal if the pole angle $\phi_{pol}=0°$. Here, $\phi_{pol}$ is the angle between the radial, or polar, direction of the signal source from the antenna boresight axis and the radial direction of the x-axis of a coordinate system centered on, and normal to, the boresight axis.

For the sake of simplicity it is further assumed that in the cases shown in FIGS. 3a and 3b, the magnitude of the antenna deviation remains constant and initially the pole angle $\phi_{pol}=0°$. That is, a deviation is assumed which is in only one direction, the positive x direction, in the cartesian coordinate system.

FIG. 3a shows the vector addition of the sum signal and of the difference signal $\Delta$, with $\Delta_1$ representing the non-phase shifted difference signal and $\Delta_2$ the difference signal shifted in phase by 180°. It can be seen that the signals $\Sigma + \Delta_1$ and $\Sigma + \Delta_2$ generated from the superposition have the same amplitudes. Thus, a change in amplitude does not take place when the phase position of the difference signal is changed from 0° to 180° or vice versa.

The situation is different in the case shown in FIG. 3b where $\Delta_3$ is the 90° phase shifted difference signal and $\Delta_4$ is the 270° phase shifted difference signal. Thus there now appears a very substantial amplitude difference between signals $\Sigma + \Delta_3$ and $\Sigma + \Delta_4$ resulting from the superposition: namely, upon a change in the phase of the difference signal from 90° to 270° there is a sudden amplitude change from signal $\Sigma + \Delta_3$ with high amplitude to signal $\Sigma + \Delta_4$ with low amplitude.

If now the pole angle changes to $\phi_{pol}=180°$—i.e., there is a deviation in the negative x direction—a jump from signal $\Sigma + \Delta_4$ with low amplitude to signal $\Sigma + \Delta_3$ with high amplitude takes place upon a change in the phase of the difference signal from 90° to 270°. For at $\phi_{pol}=180°$, $\Delta_3$ in FIG. 3b corresponds to the 270° phase shifted difference signal and $\Delta_4$ corresponds to the 90° phase shifted difference signal. The amount of the jump in amplitude thus indicates the magnitude of the deviation and the sign indicates the direction of the deviation.

A deviation in the positive or negative y direction can be determined in the same manner. These considerations can again be based on the vector diagram shown in FIG. 3b. For $\phi_{pol}=90°$ (deviation in the positive y direction), $\Delta_3$ represents the 0° phase shifted difference signal and $\Delta_4$ represents the 180° phase shifted difference signal, while for $\phi_{pol}=270°$ (deviation in the negative y direction), $\Delta_3$ represents the 180° phase shifted difference signal and $\Delta_4$ represents the 0° phase shifted signal.

The evaluation circuit AS registers the amount and sign of each amplitude change in signal $\Sigma + \Delta$ resulting after each phase shift in the phase member and forms therefrom the control signals $\Delta_x$ and $\Delta_y$ for the follow-up of the antenna in the x and y directions.

When $\phi_{pol}$ has a value other than those cited above, evaluation circuit AS forms control signals based on the deviation components along two coordinate axes.

In the above described embodiments of the invention the phase of the difference signal is changed among four different phase states. In the same way the phase of the sum signal can be changed. Essential for the operation of the tracking system is that the phase difference between the sum and the difference signal is changed. And this can be realized by changing the phase of the difference signal or by changing the phase of the sum signal.

Figure 4:
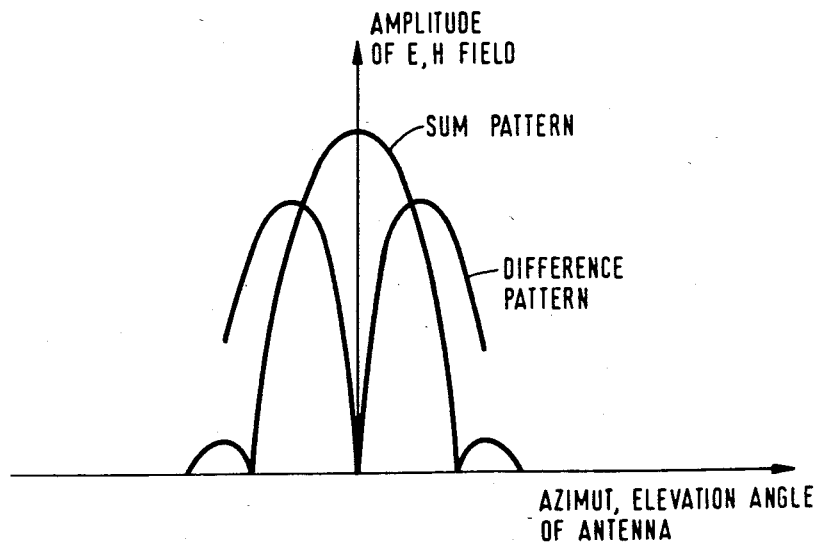
FIG. 4 shows typical sum and difference pattern of a monopulse antenna.

FIG. 4 shows typical sum and difference patterns of a monopulse antenna. The patterns are rotationally and symmetrically arranged about the boresight axis of the antenna. The sum signal $\Sigma$ which is derived from the sum pattern has a maximum on the boresight axis and the difference signal $\Delta$ which is derived from the difference pattern has a minimum on the boresight axis.

A mode coupler MK which is connected to antenna A is disclosed in U.S. Pat. Nos. 3,758,880 and 3,864,683. The manner in which the mode coupler MK is connected to the antenna A is described in U.S. Pat. No. 3,864,683 and also in the above mentioned dissertation by G. Mörz at the Rheinisch-Westfälisch Technische Hochschule Aachen, D. 82, 1978, pp. 58–90.

An embodiment of the component W which is a filter (e.g. quadruplexer) for separating signals E1, E2, S1, S2 of two different frequency bands with each frequency band being doubly orthogonally polarized is disclosed in U.S. Pat. No. 4,047,128.

The control member PS, PS' is a network (e.g. a step-by-step switch) which produces sequentially and cyclically as many different control signals as there are different phase states. Due to the 4 phase states of the embodiments of FIGS. 1 and 2 the control member PS, PS' has to deliver four different signals. A first control signal of the control member PS of FIG. 1 switches the phase shifter PH to the phase state of 0°, a second control signal switches it to the phase state of 180°, a third control signal switches it to the phase state of 90° and a fourth control signal switches it to the phase state of 270°. According to the embodiment of FIG. 2 a first control signal of the control member PS' switches the phase shifter PH1 to the phase state of 0° and connects the receiver E with the output port 1 of the coupler K3, and a second control signal connects the receiver E with the output port 2 of the coupler K3 without changing the phase state of 0° of the phase shifter. After that the third control signal switches the phase shifter PH1 to the phase state of 90° and connects the receiver E with the output port 1 of the coupler K3 without changing the phase state of 90° of the phase shifter. In this way the four states (0°, 180°, 90° and 270°) of phase difference between the sum and the difference signal are achieved in one switching cycle of the control member.

The control member PS, PS' delivers its control signals also to the evaluation circuit AS.

In this evaluation circuit AS a storage member is included which is capable of storing at least one signal $\Sigma + \Delta$ received and amplified by the receiver E. For example according to the vector diagram of FIG. 3b at first the difference signal is shifted to the phase state of 90°. Now the amplitude of the signal $\Sigma + \Delta 3$ is stored. Then the difference signal is shifted to the phase state of 270° and the amplitude of the signal $\Sigma + \Delta 3$ is measured in the evaluation circuit. Subsequently, the difference between the stored signal $\Sigma + \Delta 3$ and the finally received signal $\Sigma + \Delta 4$ is formed. From the difference $(\Sigma + \Delta 3) - (\Sigma + \Delta 4)$ results the tracking control value $\Delta x$. In the same manner the tracking control value $\Delta y$ is determined by shifting the difference signal to the phase states of 0° and 180°.

The evaluation circuit AS therefore must be able to store at least one signal amplitude $\Sigma + \Delta$ and must be able to form the difference of two signals. The output signals of the control member PS, PS' control the signal input/output of the storage member and the differential network which forms the tracking control values $\Delta x$, $\Delta y$.

It will be understood that the above description of the present invention is susceptible to various modifications, changes and adaptations, and the same are intended to be comprehended within the meaning and range of equivalents of the appended claims.

I claim:
1. Apparatus for deriving control signals for positioning an antenna to track a signal source, said antenna having a boresight axis and sum and difference radiation patterns arranged about said axis, said sum and difference patterns having maximum and minimum amplitudes, respectively on said axis, comprising first means for deriving at its output a sum signal corresponding to the sum radiation pattern of said antenna;

second means for deriving a single difference signal corresponding to the difference radiation pattern of said antenna;

controllable phase shifting means connected to said second means for receiving said difference signal and for selectively shifting the phase difference between said sum and difference signals by alternatively between one of 0° and 90°, a phase-shifted signal being produced at the output of said phase shifting means;

a 3-dB directional coupler having a first input port connected to the output of said first means, a second input port connected to the output of said phase shifting means, a first output port providing a signal corresponding to the sum of the signals at said first and second input ports and a second output port providing a signal corresponding to the difference between the signals at said first and second input ports;

an evaluation current connected to the first and second outputs of said directional coupler and generating from the sum and difference signals thereof said antenna positioning control signals; and control means connected to said phase shifting means and between said coupler outputs and said evaluation circuit for alternatively connecting each output port of said coupler in turn to said evaluation current while causing said phase shifting means to shift the phase of the difference signal alternatively by 0° and 90°.

2. A method as defined in claim 1 wherein the phase of said sum signal is constant and the phase of said difference signal is shifted with respect to that of said sum signal.

3. Apparatus as defined in claim 1 wherein said phase shifting means is connected to said second means, the phase of said sum signal being constant and the phase of said difference signal being shifted with respect to that of said sum signal.

* * * * *